N. T. BROWN.
Horse Rake.
No. 35,502. Patented June 10, 1862.
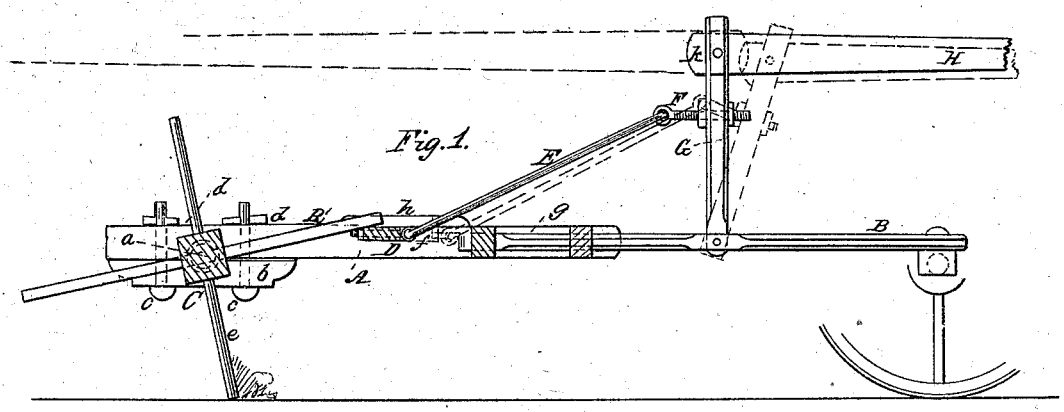
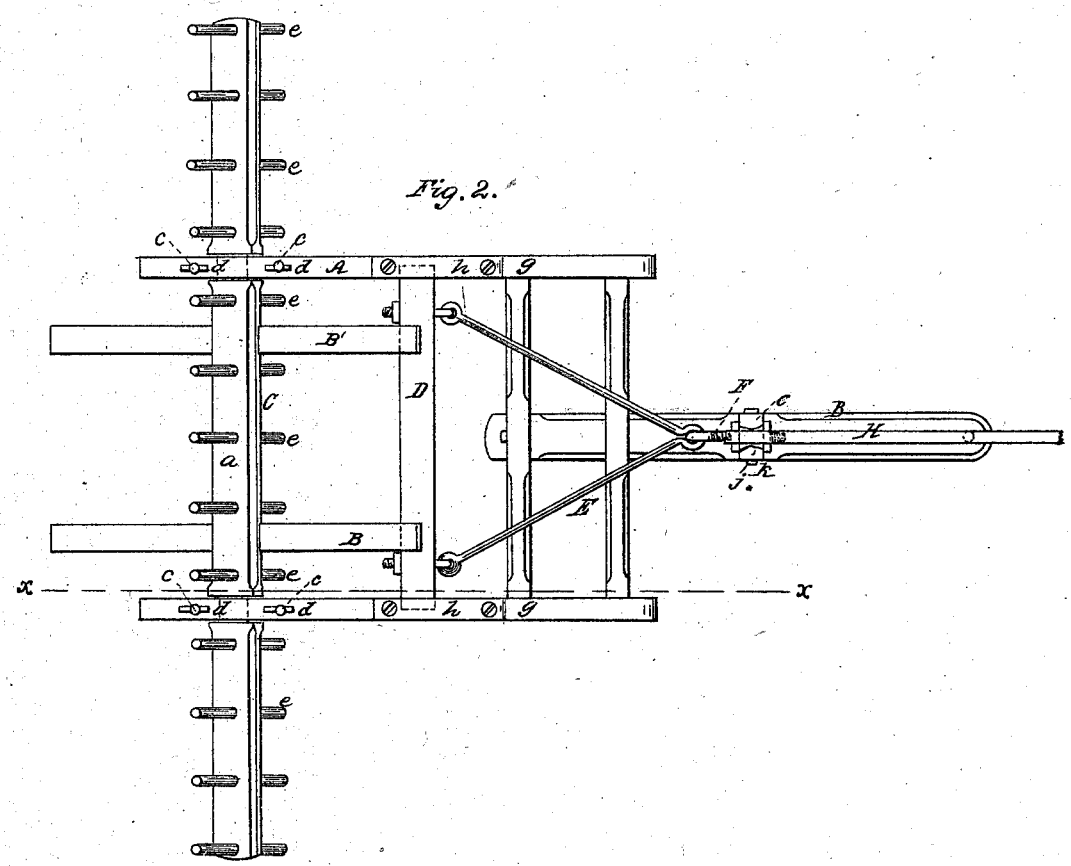
Witnesses:
Inventor:
Nicholas T. Brown
per Munn & Co.
Attorneys

UNITED STATES PATENT OFFICE.

NICHOLAS T. BROWN, OF ONONWA, IOWA.

IMPROVEMENT IN HORSE-RAKES.

Specification forming part of Letters Patent No. 35,502, dated June 10, 1862.

*To all whom it may concern:*

Be it known that I, NICHOLAS T. BROWN, of Ononwa, in the county of Louisa and State of Iowa, have invented a new and Improved Rake; and I do hereby declare that the following is a full, clear, and exact description of the same, reference being had to the accompanying drawings, making a part of this specification, in which—

Figure 1 is a side sectional view of my invention, taken in the line $x$ $x$, Fig. 2; Fig. 2, a plan or top view of the same.

Similar letters of reference indicate corresponding parts in the two figures.

This invention relates to an improved rake of that class which are drawn by a horse or team, and are commonly termed "horse-rakes."

To enable those skilled in the art to fully understand and construct my invention, I will proceed to describe it.

A represents a rectangular frame, to the front end of which a bar, B, is attached centrally, at right angles and in the same plane.

C is a rake, the head $a$ of which is fitted transversely in the back part of the frame A, and allowed to turn freely therein. The rake-head $a$ is secured in or to the frame A by means of removable bearings or caps $b$ $b$, which are attached to the frame by means of pins $c$ $c$ and keys $d$, as shown clearly in Fig. 1. By removing the keys $d$ the bearings or caps $b$ $b$ may be detached from the frame A and the rake readily removed and, with the frame, placed on a wagon for conveyance from place to place. The rake-head $a$ has teeth $e$ passing transversely through it, the teeth projecting at equal distances from both sides of the rake-head. The teeth may be of cylindrical form, and of any suitable length, as may be required.

B' B' are two bars, which pass through the rake-head $a$ transversely and at right angles to the teeth $e$. The bars B' B' are within the frame A, as shown clearly in Fig. 2, and they project at equal distances from two opposite sides of the rake-head $a$.

D is a slide, which is formed of a bar placed transversely in the frame A, the ends of the bar being fitted in recesses $f$ $f$, in the inner sides of the side pieces, $g$ $g$, of the frame A, the tops of the recesses being covered by caps $h$ $h$. The ends of the slide D are allowed to work freely in the side pieces, $g$ $g$, of the frame A, and to the slide the ends of a forked or V-shaped connecting-rod, E, are attached, the front end of which is secured by an adjustable bolt, F, to an upright lever, G, having its fulcrum-pin $i$ in the bar B of frame A. The upper end of the lever G is slotted vertically, as shown at $f$, Fig. 2, and the inner sides of the slot are cut or made of double-beveled form, as shown in said figure, in order to admit of a lever, H, which is fitted in said slot, being moved or adjusted laterally, either to the right or left. The lever H is secured to the slot $j$ of G by means of a fulcrum-pin, $k$, and said lever H may be adjusted forward, so as to extend in front of the frame A and bar B, or be turned over backward, so as to project over and back of the rake, as shown by dotted lines in Fig. 1.

The machine is arranged for use by attaching the bar B of the frame A to the running-gear of a wheel-vehicle, as indicated in Fig. 1, the back part of the vehicle being shown in red. If the attendant desires to ride in the vehicle, the lever H is adjusted forward, so that it will extend over the vehicle within convenient reach of the rider or driver. At the commencement of the operation the rider or driver shoves back the lever H, and thereby shoves back the slide D, in consequence of the latter being connected to the lever G by the rod E, and this slide, when adjusted backward to its fullest extent, is within the path of the movement of the bars B' B', the front ends of which rest or bear on the slide D and prevent the rake C from revolving under the draft movement of the machine. As the machine is drawn along the rake C performs its work, and gathers up its load, the lower ends of the teeth being in contact with the surface of the ground, and the teeth having a slightly-inclined position, their lever ends being the farthest forward, as shown clearly in Fig. 1. When the rake has gathered its load the rider or driver draws forward the lever H, and consequently the slide D, and the latter, by this movement, liberates the bars B' B', and the rake C, by means of the draft movement, makes a half-revolution, thereby discharging its load, the driver or attendant shoving back the lever H before the completion of the half-revolution of the rake, so that the bars B' B' may be arrested and retained by the slide D at the termination of the half-revolution of the rake and the latter again allowed to perform its work.

In case the driver or attendant prefers to walk while the machine is in operation, he places himself behind the machine, the lever H being adjusted in a backward position, so as to extend back of the rake and rest on the rake-head a. The lateral adjustment of the lever H, which is admitted in consequence of the beveled inner slides of the slot j, enables the driver or attendant to move said lever to the right or left, to suit his position behind the rake.

The slide D and bars B' B' form a very simple and efficient device for stopping and liberating the rake C, and the levers H G and rod E also form a simple mechanism for operating the slide D, at the same time possessing the advantage of the slide D being operated either behind or in front of the rake C, so that the driver or attendant may either walk or ride, as he may prefer. The adjustable bolt E admits of the position of the slide D being arranged relatively with the bars B' B' so as to insure the latter, when the slide is shoved backward, being caught and retained by the slide. The pitch or inclination at which the rake-teeth stand when at work is determined by the length given to the bars B' B'. The shorter these bars are made the greater will be the pitch of the teeth. By regulating the length of these bars B' B', I am thus enabled to vary the pitch of the rake-teeth. I am also enabled to dispense with curved rake-teeth, as I can give any desired pitch to the straight rake-teeth in the manner I have described.

Having thus described my invention, what I claim as new, and desire to secure by Letters Patent, is—

The combination of the bars B' B' with the straight rake-teeth e, rake-head a, slide D, rod E, slotted lever G, and reversible lever H, all in the manner and for the purpose herein shown and described.

NICHOLAS T. BROWN.

Witnesses:
    L. H. WASHBURN,
    H. M. SANFORD.